United States Patent
Hayasaka et al.

(10) Patent No.: US 9,196,163 B2
(45) Date of Patent: Nov. 24, 2015

(54) DRIVING SUPPORT APPARATUS AND DRIVING SUPPORT METHOD

(75) Inventors: Shoichi Hayasaka, Atsugi (JP);
Masayuki Shimizu, Susono (JP);
Minami Sato, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 38 days.

(21) Appl. No.: 14/240,808

(22) PCT Filed: Aug. 26, 2011

(86) PCT No.: PCT/JP2011/069329
§ 371 (c)(1),
(2), (4) Date: Feb. 25, 2014

(87) PCT Pub. No.: WO2013/030906
PCT Pub. Date: Mar. 7, 2013

(65) Prior Publication Data
US 2014/0288816 A1    Sep. 25, 2014

(51) Int. Cl.
*G08G 1/16* (2006.01)
*G08G 1/0969* (2006.01)

(52) U.S. Cl.
CPC .............. *G08G 1/166* (2013.01); *G08G 1/0969* (2013.01); *B60T 2201/022* (2013.01)

(58) Field of Classification Search
CPC . G08G 1/0969; G08G 1/166; B60T 2201/022

USPC .................................................. 701/300–301
See application file for complete search history.

(56) References Cited

U.S. PATENT DOCUMENTS

| 6,169,495 B1 * | 1/2001 | Koike ........................... 701/302 |
| 8,577,550 B2 * | 11/2013 | Lu et al. ......................... 701/41 |

FOREIGN PATENT DOCUMENTS

| JP | 2004-164315 A | | 6/2004 |
| JP | 2004-164315 | * | 10/2004 |
| JP | 2004-302621 | * | 10/2004 |
| JP | 2004-302621 A | | 10/2004 |
| JP | 2006-256493 A | | 9/2006 |
| JP | 2007-257338 | * | 10/2007 |
| JP | 2007-257338 A | | 10/2007 |
| JP | 2010-257298 A | | 11/2010 |

* cited by examiner

*Primary Examiner* — Nga X Nguyen
(74) *Attorney, Agent, or Firm* — Kenyon & Kenyon LLP

(57) ABSTRACT

There are provided a driving support apparatus and a driving support method in which the reliability can be improved. In the driving support apparatus, in a traveling direction of the host vehicle and a direction crossing the traveling direction, an intersection where the host vehicle and the moving object cross is predicted; a virtual TTC that it takes for the host vehicle to arrive at the intersection and a virtual TTV that it takes for the moving object to arrive at the intersection when the moving object moves in the direction crossing the traveling direction at a virtual speed which is set virtually, are respectively acquired; and the driving support in the host vehicle is implemented based on the relative relationship between the virtual TTC and the virtual TTV.

7 Claims, 6 Drawing Sheets

DRIVING SUPPORT APPARATUS AND DRIVING SUPPORT METHOD

CROSS-REFERENCE TO RELATED APPLICATIONS

This is a national phase application based on the PCT International Patent Application No. PCT/JP2011/069329 filed on Aug. 26, 2011, the entire contents of which are incorporated herein by reference.

TECHNICAL FIELD

The present invention relates to a driving support apparatus and a driving support method that implement a driving support for avoiding a collision of a host vehicle and a moving object.

BACKGROUND ART

As a driving support apparatus in the related art, for example, an apparatus disclosed in Patent Literature 1 is known. In the driving support apparatus disclosed in Patent Literature 1, a position of an object which is present on a traveling direction of the host vehicle is detected, and then, it is determined whether or not a lateral movement speed of the detected object with respect to the traveling direction is equal to or less than a predetermined speed. Then, in the driving support apparatus, in a case where the moving speed is determined to be less than the predetermined speed, based on a detected angle formed by the detection direction of the moving object and the traveling direction of the host vehicle, a possibility of a collision between the host vehicle and the moving object is determined.

CITATION LIST

Patent Literature

[Patent Literature 1] Japanese Unexamined Patent Application Publication No. 2010-257298

SUMMARY OF INVENTION

Technical Problem

Incidentally, in a situation where a moving object such as a pedestrian is moving in the same direction as a traveling direction of a host vehicle, there is a case in which the moving object changes its direction to the crossing direction when the vehicle passes by the side of moving object. With respect to such a situation, in a case where a possibility of collision of the host vehicle and the moving object is determined based on a detection angle formed of the detection direction of the moving object and the traveling direction of the host vehicle as in the driving support apparatus in the related art, there is a possibility of a late response. Therefore, it is desirable to provide a driving support in which a situation described above is assumed in advance.

The present invention is made to solve the problem described above, and has an object to provide a driving support apparatus and a driving support method in which reliability can be improved.

Solution to Problem

In order to solve the problem described above, a driving support apparatus according to the present invention implements a driving support for avoiding a collision of a host vehicle and a moving object; predicts an intersection where the host vehicle and the moving object cross, in a traveling direction of the host vehicle and a direction crossing the traveling direction; acquires a first time that it takes for the host vehicle to arrive at the intersection and a second time that it takes for the moving object to arrive at the intersection when the moving object moves in the direction crossing the traveling direction at a virtual speed which is set virtually; and determines whether the driving support in the host vehicle is to be implemented or not based on the relative relationship between the first time and the second time.

In the driving support apparatus, the intersection where the host vehicle and the moving object cross is predicted, and the first time that it takes for the host vehicle to arrive at the intersection and the second time that it takes for the moving object to arrive at the intersection when the moving object moves in a direction crossing the traveling direction at a virtual speed which is set virtually, are respectively acquired. Then, the driving support in the host vehicle is implemented based on the relative relationship between the predicted first time and the second time. In this way, since the driving support can be implemented by predicting the crossing of the moving object, and the driving support can be implemented even with respect to the moving object which does not actually cross. Therefore, when the host vehicle is passing by the side of the moving object, it is possible to cope with the situation in which the moving object suddenly changes its moving direction to the crossing direction. Therefore, it is possible to improve the reliability.

The driving support apparatus includes: first time prediction means for predicting the first time that it takes for the host vehicle to arrive at the intersection in the traveling direction; second time prediction means for predicting the second time that it takes for the moving object to arrive at the intersection at the virtual speed in the direction crossing the traveling direction; driving support determination means for determining whether or not to implement the driving support in the host vehicle by applying the first time and the second time predicted by the first time prediction means and the second time prediction means, respectively, to a map set in advance; and driving support control means for controlling the driving support in the host vehicle in a case where the driving support determination means determines to implement the driving support in the host vehicle. In this way, by applying the first time and the second time to the map set in advance, the necessity of the driving support can be more accurately determined.

The driving support apparatus further includes: traveling state detection means for detecting a traveling state of the host vehicle; moving object state detection means for detecting a state of the moving object; predicted movement direction calculation means for calculating a predicted movement direction of the host vehicle based on the state of the host vehicle detected by the traveling state detection means; vector detection means for detecting a speed vector from the state of the moving object detected by the moving object state detection means; and angle determination means for calculating an angle formed of the predicted movement direction of the host vehicle and the direction of the moving object, and determining whether or not the formed angle is equal to or larger than the predetermined angle. In a case where the formed angle is not determined to be equal to or larger than the predetermined angle by the angle determination means, the driving support determination means uses the map. In a case where the formed angle is determined to be equal to or larger than the predetermined angle by the angle determination means, the driving support determination means uses the second map in which the time that it takes for the moving object to arrive at the intersection when the moving object moves in a direction crossing the traveling direction at the detected speed of the moving object in the map is set to be the second time. In this way, by using the different maps depending on the angle formed of the predicted movement direction of the host vehicle and the direction of the moving object, it is possible to appropriately implement the driving support according to the positional relationship between the host vehicle and the moving object.

In the map and the second map, the first time is set as the vertical axis and the second time is set as the horizontal axis, and a first area where the driving support is determined not to be necessary and a second area where the driving support is determined to be necessary are set. In a case where a point in which the first time and the second time cross is present in the second area, the driving support determination means determines that the driving support in the host vehicle is to be implemented. By using such a map, the determination of the necessity of the driving support can be more accurately performed.

The map and the second map are configured to be a single map.

According to the present invention, there is provided a driving support method for avoiding a collision of a host vehicle and a moving object, including: predicting an intersection where the host vehicle and the moving object cross in a traveling direction of the host vehicle and a direction crossing the traveling direction, respectively; acquiring a first time that it takes for the host vehicle to arrive at the intersection and a second time that it takes for the moving object to arrive at the intersection when the moving object moves in a direction crossing the traveling direction at a virtual speed which is set virtually; and determining whether the driving support in the host vehicle is to be implemented or not based on the relative relationship between the first time and the second time.

Advantageous Effects of Invention

According to the present invention, the reliability can be improved.

DESCRIPTION OF EMBODIMENTS

Figure 1:
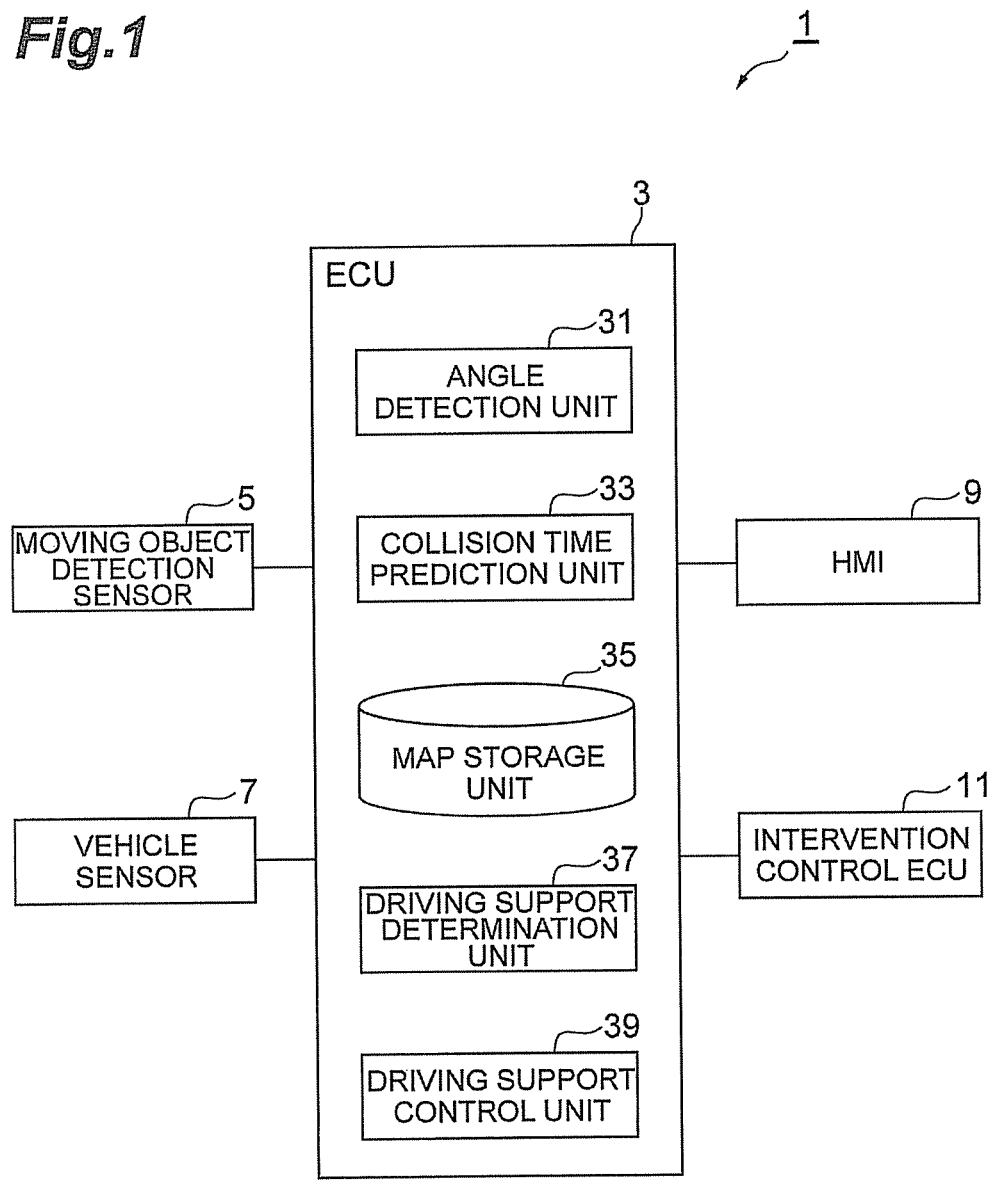
FIG. 1 is a diagram illustrating a configuration of a driving support apparatus in an embodiment.

FIG. 1 is a diagram illustrating a configuration of a driving support apparatus in an embodiment. The driving support apparatus 1 illustrated in FIG. 1 is an apparatus that is mounted on a vehicle such as a car, and performs a driving support for avoiding a collision with a moving object such as a pedestrian, a bicycle, or the like. Moreover, the driving support includes performing an intervention control such as direct braking or steering in a host vehicle, and giving a warning to a driver.

As illustrated in FIG. 1, the driving support apparatus 1 includes an electronic control unit (ECU) 3. A moving object detection sensor (moving object state detection means) 5, a vehicle sensor (traveling state detection means) 7, a human machine interface (HMI) 9, and an intervention control ECU 11 are connected to the ECU 3. The ECU 3 and the intervention control ECU 11 are the electronic control units made from a central processing unit (CPU), a read only memory (ROM), and a random access memory (RAM), and are operated by the program.

The moving object detection sensor 5 is an external sensor that detects the moving object. The moving object detection sensor 5 is, for example, imaging means such as laser radar, millimeter wave radar, or a camera. In a case of being millimeter wave radar, the moving object detection sensor 5 detects the moving object positioned in front of the host vehicle by receiving and transmitting the Radar waves in the millimeter wave band which is frequency-modulated, and generates moving object information such as a position and a speed of the moving object based on the detection result. The moving object detection sensor 5 outputs the moving object information to the ECU 3. Moreover, in a case of being a camera, the moving object detection sensor 5 generates the moving object information by implementing image processing on the captured image. In addition, the moving object detection sensor 5 may be configured with both of the millimeter wave radar and a camera.

The vehicle sensor 7 is an internal sensor that detects the traveling state of the host vehicle. The vehicle sensor 7 is, for example, a yaw rate sensor that detects a yaw rate of the vehicle, a steering angle sensor that detects a steering angle in steering, or a vehicle speed sensor that detects the speed (traveling speed) of the vehicle. The vehicle sensor 7 outputs vehicle information that indicates the detected traveling state of the host vehicle to the ECU 3.

The ECU 3 includes an angle determination unit (angle detection means, predicted movement direction calculation means, and vector detection means) 31, a collision time prediction unit (first time prediction means and second time prediction means) 33, a map storage unit 35, a driving support determination unit (driving support determination means) 37, and a driving support control unit (driving support control means) 39.

The angle determination unit 31 is a part that determines an angle A formed of the host vehicle and the moving object. When the moving object information output from the moving object detection sensor 5 is received, the angle determination unit 31 detects a speed vector of the moving object from the moving object information. In addition, when the vehicle information output from the vehicle sensor 7 is received, the angle determination unit 31 calculates the predicted movement direction (trajectory) based on the vehicle information. The angle determination unit 31 calculates the angle A formed of the speed vector of the moving object (direction of the moving object) and the predicted movement direction of the host vehicle, and determines whether the formed angle A is equal to or larger than a threshold value B or not. The threshold value B is set based on an experiment or the like. The angle determination unit 31 outputs result information indicating the determination result to a collision time prediction unit 33 and the driving support determination unit 37.

The collision time prediction unit 33 is a part that predicts a time until the host vehicle and the moving object arrive at an intersection. When the moving object information output from the moving object detection sensor 5, the vehicle information output from the vehicle sensor 7, and the result information output from the angle determination unit 31 are received, the collision time prediction unit 33 calculates, based on the moving object information and the vehicle information, the collision time of the host vehicle and the moving object, that is, the time until the host vehicle and the moving object both arrive at the intersection where the host vehicle and the moving object cross.

In a case where the result information indicates that the formed angle A is equal to or larger than the threshold value B (formed angle A ≥threshold value B), the collision time prediction unit 33 obtains a forecasted trajectory of the host vehicle based on the vehicle information, and calculates the time that it takes for the host vehicle to arrive at the intersection, that is, calculates a time to collision (TTC, a first time) which is a value indicating how many seconds will elapse before the host vehicle collides with the moving object in a case where the host vehicle travels in a traveling direction in the current state. In addition, the collision time prediction unit 33 obtains a speed vector or the like of the moving object, based on the moving object information, and calculates the time that it takes for the moving object to arrive at the intersection, that is, calculates a time to vehicle (TTV, a second time) which is a value indicating how many seconds will elapse before the moving object collides with the host vehicle in a case where the moving object moves in a direction crossing the traveling direction of the host vehicle (the lateral direction of the host vehicle) in the current state (moving speed).

The collision time prediction unit 33 calculates the TTC and the TTV by Equations (1) and (2) shown below.

$$TTC = x/(V-vx) \quad (1)$$

$$TTV = y/vy \quad (2)$$

In Equations (1) and (2) above, V indicates a speed of the host vehicle, x and y indicate a relative position of the moving object, and vx and vy indicate the speed of the moving object. The collision time prediction unit 33 outputs TTC information and TTV information that indicate the calculated TTC and TTV, respectively, to the driving support determination unit 37.

Figure 2:
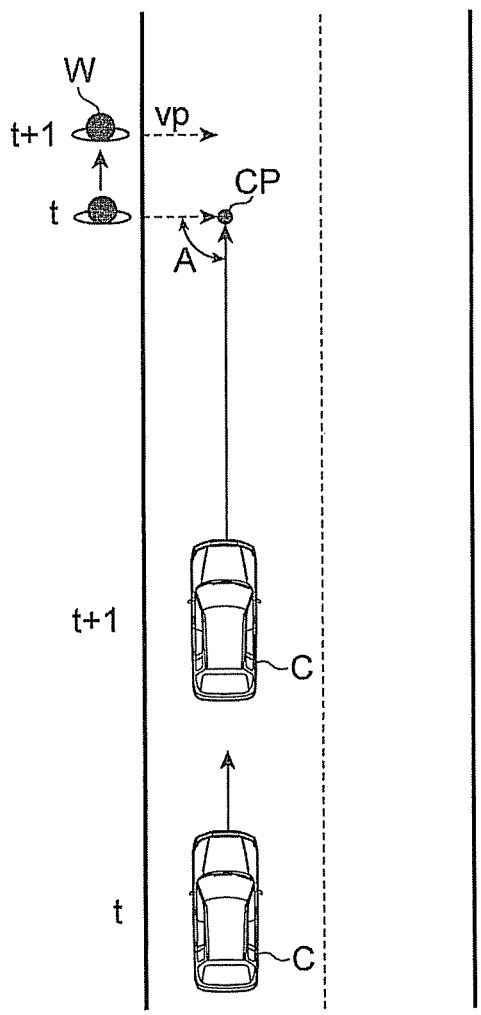
FIG. 2 is a diagram illustrating a virtual intersection.

In addition, when the result information output from the angle determination unit 31 is received, in a case where the result information does not indicate that the formed angle A is equal to or larger than the threshold value B, the collision time prediction unit 33 sets a virtual moving speed (virtual speed) of the moving object. As illustrated in FIG. 2, in a case where a moving object W moves at a virtual speed vp, the collision time prediction unit 33 sets a virtual intersection (cross point) CP at which the moving object intersects a host vehicle C. A virtual intersection CP moves according to the time variation (t→t+1) of the host vehicle C and the moving object W. Then, the collision time prediction unit 33 calculates a virtual TTC that it takes for the host vehicle C to arrive at the virtual intersection CP and a virtual TTV that it takes for the moving object W to arrive at the virtual intersection CP. The collision time prediction unit 33 outputs virtual TTC information and virtual TTV information that indicate the calculated virtual TTC and the calculated virtual TTV, respectively, to the driving support determination unit 37.

Figure 3:
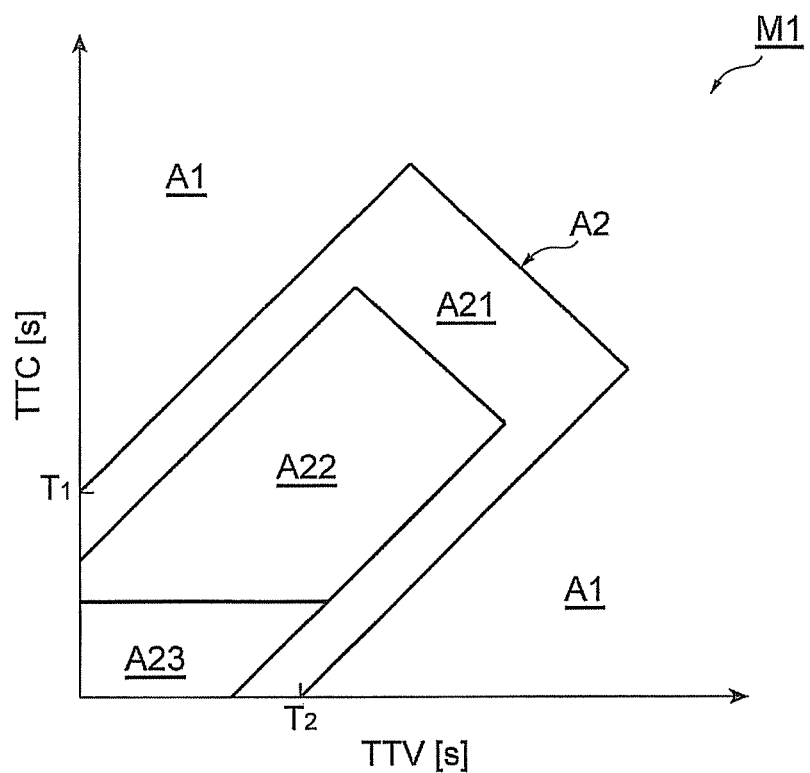
FIG. 3 is a diagram illustrating a map.

The map storage unit 35 stores a map (a second map) M1 and a map M2. FIG. 3 is a diagram illustrating the map. As illustrated in FIG. 3, in the map M1, a vertical axis is set to TTC [s] and a horizontal axis is set to TTV [s], and the relationship between the TTC and the TTV is illustrated. In the map M1, the origin is set to the intersection of the host vehicle and the moving object. In the map M1, the point which is located away from the origin (the TTC and the TTV increase) means that the host vehicle and the moving object are positioned at the position located away from the intersection. In the map M1, a driving support unnecessary area (a first area) A1 and a driving support area (a second area) A2 are set. The map M1 will be described below in detail.

The driving support area A2 is a region surrounded by a function y=fx (TTC, TTV). Two straight lines that define the driving support area A2 are set to be a difference between the TTC and the TTV (TTC−TTV). In the map M1, $T_1$ and $T_2$ are set to one to three seconds, for example.

In the driving support area A2, a plurality of control contents of the driving support are set in advance according to the level of emergency; and an HMT area A21, an intervention control area A22, and an emergency intervention control area A23 are set. The HMI area A21 is an area where the driving support such as performing a warning with respect to the driver is implemented. The intervention control area A22 is set inside the HMI area A21. The intervention control area A22 is an area where an intervention control such as braking is implemented. The emergency intervention control area A23 is an area where emergency braking is implemented, and an emergency intervention control is implemented for avoiding the collision. The emergency intervention control area A23 is set near the origin of the map M1, that is, a position near the intersection of the host vehicle and the moving object.

The driving support unnecessary area A1 is the area other than the driving support area A2, and is the area where the driving support for avoiding the collision of the host vehicle and the moving object is not necessary. That is, in a case of the driving support unnecessary area A1, at the time when the host vehicle arrives at the intersection, the moving object has already passed the intersection, or the moving object is positioned at a position separate from the intersection.

Figure 4:
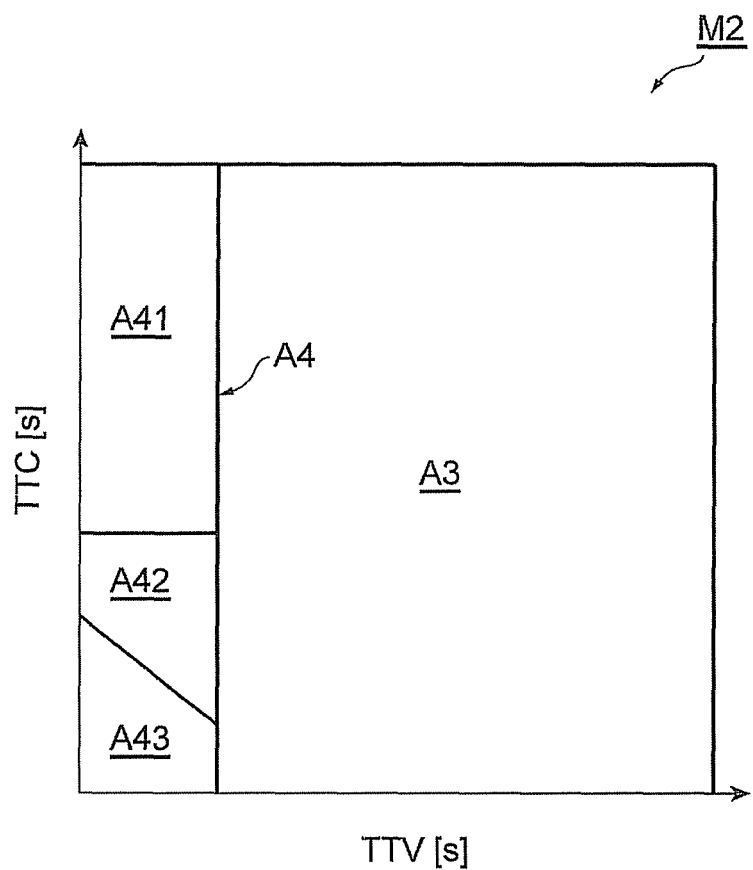
FIG. 4 is a diagram illustrating a map.

Subsequently, the map M2 will be described. FIG. 4 is a diagram illustrating a map. As illustrated in FIG. 4, in the map M2, a vertical axis is set to TTC [s] and a horizontal axis is set to TTV [s], and the relationship between the TTC and the TTV is illustrated. In the map M2, the origin is set to the intersection of the host vehicle and the moving object. In the map M2, the point which is located away from the origin (the TTC and the TTV increase) means that the host vehicle and the moving object are positioned at the position located away from the intersection. In the map M2, a driving support unnecessary area A3 and a driving support area A4 are set.

In the driving support area A4, a plurality of control contents of the driving support are set in advance according to the level of emergency, and an HMI area A41, an intervention control area A42, and an emergency intervention control area A43 are set. The HMI area A41 is an area where the driving support such as performing a warning with respect to the driver is implemented. The intervention control area A42 is an area in which an intervention control such as braking is implemented. The emergency intervention control area A43 is an area where emergency braking is implemented, and an emergency intervention control is implemented for avoiding the collision. The emergency intervention control area A43 is set near the origin of the map M2, that is, at a position near the intersection of the host vehicle and the moving object. The driving support unnecessary area A3 is the area other than the driving support area A4, and is the area where the driving support for avoiding the collision of the host vehicle and the moving object is not necessary.

In the map M1 and the map M2, the driving support areas A2 and A4 and the driving support unnecessary areas A1 and A3 may be set based on experimental data, or may be set by learning the driving characteristics (acceleration characteristics, braking characteristics, and the like) of the driver. In addition, in the maps M1 and M2, the amounts of control of the driving support may be set in the intervention control areas A22 and A42, and in the emergency intervention control areas A23 and A43, respectively. Furthermore, the map M2 may be set according to the surrounding environment (such as weather) of the host vehicle. The maps M1 and M2 stored in the map storage unit 35 are made to be rewritable (updating of the driving support control unit 39).

Figure 5:
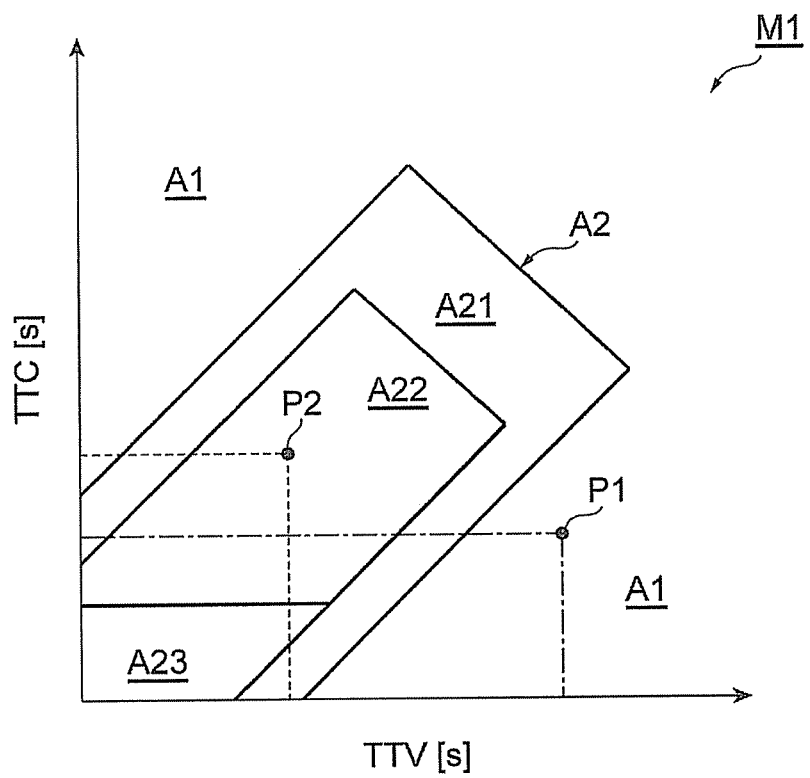
FIG. 5 is a diagram describing a method of determining a necessity of the driving support in a driving support determination unit.

The driving support determination unit 37 is a part that determines whether the driving support in the host vehicle is to be implemented or not. The driving support determination unit 37 applies the TTC and the TTV or the virtual TTC and the virtual TTV to the map M1 or the map M2, and determines whether the driving support is to be implemented or not in the host vehicle. Specifically, the driving support determination unit 37 applies the TTC information and the TTV information output from the collision time prediction unit 33 to the map M1, and determines which position on the map M1 is the intersection where the TTC and the TTV cross. For example, as illustrated in FIG. 5, in a case where the TTC and the TTV cross at a point P1, since the point P1 is in the driving support unnecessary area A1, the driving support determination unit 37 determines that the driving support in the host vehicle is not implemented. That is, for example, in a case of crossing at the point P1, at the time when the moving object arrives at the intersection, the host vehicle has already passed the intersection.

In contrast, in a case where the TTC and the TTV cross at a point P2, since the point P2 is in the driving support area A2 (intervention control area A22), the driving support determination unit 37 determines that the driving support in the host vehicle is implemented. In a case of determining the driving support is to be implemented, the driving support determination unit 37 outputs support implementation information which indicates any of the HMI area A21, the intervention control area A22, and the emergency intervention control area A23, to the driving support control unit 39.

In addition, the driving support determination unit 37 applies the virtual TTC information and the virtual TTV information output from the collision time prediction unit 33 to the map M2, and determines which position on the map M2 is the intersection where the virtual TTC and the virtual TTV cross. In a case of determining the driving support is to be implemented, the driving support determination unit 37 outputs support implementation information which indicates any of the HMI area A41, the intervention control area A42, and the emergency intervention control area A43, to the driving support control unit 39.

Referring back to FIG. 1, the driving support control unit 39 is a part which controls the driving support in the host vehicle. When the support implementation information output from the driving support determination unit 37 is received, the driving support control unit 39 controls the driving support (intervention control) based on the support implementation information. The intervention control is the braking control or the steering control, for example. The driving support control unit 39 outputs a warning instruction signal to the HMI 9 in a case where information indicating the HMI areas A21 and A41 is included in the support implementation information.

The driving support control unit 39 calculates the amount of control of the intervention control in a case where the information indicating the intervention control areas A22 and A42 and the emergency intervention control areas A23 and A43 is included in the support implementation information. The driving support control unit 39 calculates the amount of control (target acceleration (deceleration), speed) of the braking based on the map M1 or the map M2 in a case where the amount of control in the intervention control areas A22 and A42 and the emergency intervention control areas A23 and A43 of the driving support control unit 39 is set. In addition, the driving support control unit 39 calculates the amount of braking based on Equation (3) described below in a case where the amount of control in the map M1 and the map M2 is not set.

$$\alpha \times TTC + \beta \times TTV + \gamma \qquad (3)$$

Here, $\alpha$ and $\beta$ are coefficients, and $\gamma$ is a constant. $\alpha$, $\beta$, and $\gamma$ are set based on the experimental value, or the like. In addition, the amount of control of steering is calculated based on the experimental value or a predetermined equation. The driving support control unit 39 outputs the intervention control signal including the amount of control to the intervention control ECU 11.

For example, a buzzer, a head up display (HUD), a monitor of a navigation system, and a meter panel are examples of the HMI 9. When the warning instruction signal output from the ECU 3 is received, the HMI 9 sounds a warning voice which warns the driver that the moving object is present ahead, or displays a warning statement or the like. For example, in a case where the HMI 9 is the HUD, the HMI 9 displays a pop-up indicating that the moving object is present on a windshield.

The intervention control ECU 11 is an ECU that causes the host vehicle to implement the intervention control. The intervention control ECU 11 is configured to include a brake ECU, an engine ECU, or the like (none of these are illustrated). When the intervention control signal output from the ECU 3 is received, the intervention control ECU 11 controls, for example, a brake actuator or a steering actuator (both are not illustrated) according to the amount of control included in the intervention control signal, and implements an automatic intervention control.

Figure 6:
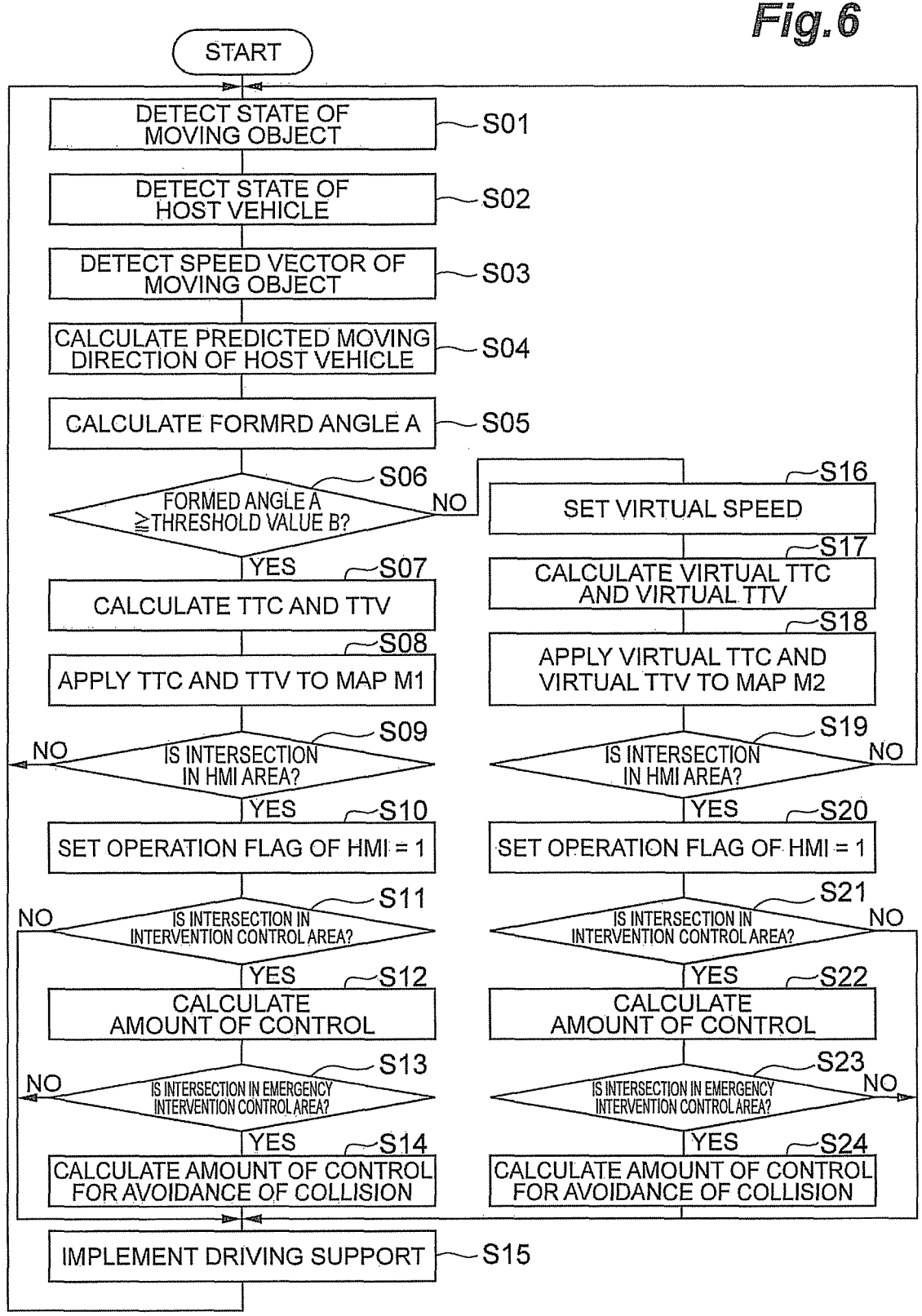
FIG. 6 is a flow chart illustrating an operation of the driving support apparatus.

Subsequently, the operation of the driving support apparatus 1 will be described. FIG. 6 is a flowchart illustrating the operation of the driving support apparatus.

As illustrated in FIG. 6, first, the state of the moving object is detected by the moving object detection sensor 5 (STEP S01). In addition, the traveling state of the host vehicle is detected by the vehicle sensor 7 (STEP S02). Next, from the moving object information detected by the moving object detection sensor 5, the speed vector of the moving object is detected by the angle determination unit 31 (STEP S03). In addition, based on the vehicle information generated by the vehicle sensor 7, the predicted movement direction of the host vehicle is calculated (STEP S04).

Subsequently, the angle A formed of the speed vector of the moving object and the predicted movement direction of the host vehicle is calculated by the angle determination unit 31 (STEP S05). Then, the angle determination unit 31 determines whether the calculated angle A is equal to or larger than the threshold value B or not (STEP S06). In a case where the formed angle A is determined to be equal to or larger than the threshold value B, the process proceeds to STEP S07. In contrast, in a case where the formed angle A is not determined to be equal to or larger than the threshold value B, the process proceeds to STEP S16.

In STEP S07, based on the moving object information and the vehicle information detected by the moving object detection sensor 5 and the vehicle sensor 7, respectively, the TTC and the TTV are calculated by the collision time prediction unit 33. Then, the TTC and the TTV calculated by the collision time prediction unit 33 are applied to the map M1 stored in the map storage unit 35 (STEP S08), and the determination on whether the driving support in the host vehicle is to be implemented or not is performed by the driving support determination unit 37.

In the driving support determination unit 37, the determination on whether or not the intersection of the TTC and TTV is in the HMI area A21, that is, in the driving support area A2, is performed (STEP S09). In a case where the intersection is determined to be in the HMI area A21, an HMI operation flag is set to "1" (STEP S10). In contrast, in a case where the intersection is not determined to be in the HMI area A21, that is, determined to be in the driving support unnecessary area A1, the process returns to STEP S01.

Next, in the driving support determination unit 37, the determination on whether the intersection is in the intervention control area A22 or not is performed (STEP S11). In a case where the intersection is determined to be in the intervention control area A22, the amount of control of the intervention control is calculated in the driving support control unit 39 based on the map M1, for example (STEP S12). In contrast, in a case where the intersection is not determined to be in the intervention control area A22, the process proceeds to STEP S15.

Next, in the driving support determination unit 37, the determination is performed whether or not the intersection is in the emergency intervention control area A23 (STEP S13). In a case where the intersection is determined to be in the emergency intervention control area A23, the amount of control for the emergency avoidance in the driving support control unit 39 is calculated (STEP S14). In contrast, in a case where the intersection is not determined to be in the emergency intervention control area A23, the process proceeds to STEP S15.

In STEP S15, the driving support is implemented. Specifically, the warning is performed with respect to the driver by the HMT 9. In addition, the intervention control is implemented by the intervention control ECU 11 together with the warning by the HMI 9.

In STEP S16, the virtual moving speed (virtual speed) of the moving object is set by the collision time prediction unit 33. Then, based on the virtual moving speed of the moving object, the virtual TTC and the virtual TTV are calculated by the collision time prediction unit 33 (STEP S17). Then, the virtual TTC and the virtual TTV calculated by the collision time prediction unit 33 are applied to the map M2 stored in the map storage unit 35 (STEP S18), and the determination on whether the driving support is to be implemented in the host vehicle or not is performed by the driving support determination unit 37.

In the driving support determination unit 37, the determination on whether or not the intersection of the virtual TTC and the virtual TTV is in the HMT area A41, that is, whether the intersection is in the driving support area A4, is performed (STEP S19). In a case where the intersection is determined to be in the HMI area A41, the HMT operation flag is set to "1" (STEP S20). In contrast, in a case where the intersection is not determined to be in the HMI area A41, that is, the intersection is determined to be in the driving support unnecessary area A3, the process returns to STEP S01.

Next, in the driving support determination unit 37, the determination on whether the intersection is in the intervention control area A42 or not is performed (STEP S21). In a case where the intersection is determined to be in the intervention control area A42, the amount of control of the intervention control is calculated based on the map M2, for example, in the driving support control unit 39 (STEP S22).

In contrast, in a case where the intersection is not determined to be in the intervention control area A42, the process proceeds to STEP S15.

Next, in the driving support determination unit 37, the determination on whether the intersection is in the emergency intervention control area A43 or not is performed (STEP S23). In a case where the intersection is determined to be in the emergency intervention control area A43, the amount of control for the emergency avoidance is calculated in the driving support control unit 39 (STEP S24). In contrast, in a case where the intersection is not determined to be in the emergency intervention control area A43, the process proceeds to STEP S15.

As described above, in the present embodiment, the intersection CP where the host vehicle and the moving object cross is predicted, and the virtual TTC that it takes for the host vehicle to arrive at the intersection, and the virtual TTV that it takes for the moving object to arrive at the intersection CP when the moving object moves in a direction crossing the traveling direction at a virtual speed vp which is set virtually, are respectively acquired. Then, based on the relative relationship with the predicted virtual TTC and the predicted virtual TTV, the necessity of the implementation of the driving support is determined. In this way, since the driving support can be implemented by predicting the crossing of the moving object, the driving support can also be implemented even with respect to the moving object which is not actually crossing. Therefore, when the host vehicle is passing by the side of the moving object, it is possible to cope with the situation in which the moving object suddenly changes its moving direction to the crossing direction. Therefore, the reliability can be improved.

In addition, in the present embodiment, the angle A formed of the predicted movement direction of the host vehicle and the direction of the moving object is calculated, and in a case where the formed angle A is equal to or larger than the threshold value B, the determination on whether the driving support is to be implemented or not is performed using the map M1, and in a case where the formed angle A is smaller than the threshold value B, the determination on whether the driving support is to be implemented is performed using the map M2. In this way, by using the different maps M1 and M2 depending on the formed angle A, it is possible to implement optimum driving support according to the positional relationship between the host vehicle and the moving object.

In addition, on the maps M1 and M2, the driving support unnecessary areas A1 and A3 and the driving support areas A2 and A4 are set. In the driving support areas A2 and A4, the HMI areas A21 and A41, the intervention control areas A22 and A42, and the emergency intervention control areas A23 and A43 are set. By using such maps M1 and M2, necessity of the driving support can be accurately determined, and it is possible to appropriately implement the driving support according to the situation.

The present invention is not limited to the embodiment described above. For example, in the embodiment described above, the map M1 and the map M2 are used separately. However, the map M1 and the map M2 may be a single map.

In addition, in the embodiment described above, in a case where the intervention control is implemented by the intervention control ECU 11, the warning by the HMI 9 is also implemented simultaneously. However, when the intervention control is implemented, the warning by the HMI 9 may not be implemented.

Furthermore, in addition to the embodiment described above, by providing means for acquiring surrounding information (environmental information) of the host vehicle, driving support may be implemented according to the surrounding situation (for example, a presence or an absence of an oncoming vehicle, or the like of the host vehicle).

Reference Signs List 1 driving support apparatus
3 ECU
5 moving object detection sensor
7 vehicle sensor
31 angle determination unit (angle determination means)
33 collision time prediction unit (first time prediction unit, second time prediction unit)
35 map storage unit
37 driving support determination unit (driving support determination means)
39 driving support control unit (driving support control means)
M1 map (second map)
M2 map (map)

The invention claimed is:

1. A driving support apparatus that implements a driving support for avoiding a collision of a host vehicle and a moving object, the apparatus comprising:
    first time prediction means for predicting an intersection where the host vehicle and the moving object cross in a traveling direction of the host vehicle and a direction crossing the traveling direction, and predicting a first time that it takes for the host vehicle to arrive at the intersection;
    second time prediction means for predicting a second time that it takes for the moving object to arrive at the intersection when the moving object moves in the direction crossing the traveling direction at a virtual speed which is set virtually;
    driving support determination means for determining whether the driving support is to be implemented or not in the host vehicle by applying the first time and the second time predicted by the first time prediction means and the second time prediction means, respectively, to a map set in advance;
    driving support control means for controlling the driving support in the host vehicle in a case where the driving support determination means determines that the driving support is to be implemented in the host vehicle;
    traveling state detection means for detecting a traveling state of the host vehicle;
    moving object state detection means for detecting a state of the moving object;
    predicted moving direction calculation means for calculating a predicted moving direction of the host vehicle based on the state of the host vehicle detected by the traveling state detection means;
    vector detection means for detecting a speed vector of the moving object from the state of the moving object detected by the moving object state detection means; and
    angle determination means for calculating an angle formed by the predicted moving direction of the host vehicle and the direction of the moving object, and determining whether or not the made angle is equal to or larger than a predetermined angle,
    wherein, in a case where the made angle is not determined to be equal to or larger than the predetermined angle by the angle determination means, the driving support determination means uses the map, and
    wherein, in a case where the made angle is determined to be equal to or larger than the predetermined angle by the angle determination means, the driving support determination means uses a second map in which the time that it takes for the moving object to arrive at the intersection when the moving object moves in a direction crossing the traveling direction at the detected speed of the moving object in the map is set to be the second time.

2. The driving support apparatus according to claim 1,
wherein, in the map and the second map, the first time is set as the vertical axis and the second time is set as the horizontal axis, and a first area where the driving support is determined not to be necessary and the second area where the driving support is determined to be necessary are set, and
wherein, in a case where a point at which the first time and the second time cross is present in the second area, the driving support determination means determines that the driving support in the host vehicle be implemented.

3. The driving support apparatus according to claim 1,
wherein the map and the second map are configured to be a single map.

4. A driving support method for avoiding a collision of a host vehicle and a moving object, the method comprising:
    a first time prediction step of predicting an intersection where the host vehicle and the moving object are crossing in a traveling direction of the host vehicle and a direction crossing the traveling direction, and predicting a first time that it takes for the host vehicle to arrive at the intersection;
    a second time prediction step of predicting a second time that it takes for the moving object to arrive at the intersection when the moving object moves in a direction crossing the traveling direction at a virtual speed which is set virtually,
    a driving support determination step of determining whether the driving support is to be implemented or not in the host vehicle by applying the first time and the second time predicted in the first time prediction step and the second time prediction step, to a map set in advance;
    a driving support control step of controlling the driving support in the host vehicle in a case where the driving support is determined to be implemented in the driving support determination step;
    a traveling state detection step of detecting a traveling state of the host vehicle;
    a moving object state detection step of detecting a state of the moving object;
    a predicted moving direction calculation step of calculating a predicted moving direction of the host vehicle based on the state of the host vehicle detected in the traveling state detection step;
    a vector detection step of detecting a speed vector of the moving object from the state of the moving object detected by the moving object state detection step; and
    an angle determination step of calculating an angle made of the predicted moving direction of the host vehicle and the direction of the moving object, and determining whether the made angle is equal to or larger than a predetermined angle or not,
    wherein, in the step of driving support determination, the map is used in a case where the made angle is not determined to be equal to or larger than the predetermined angle in the angle determination step, and
    wherein, in a case where the made angle is determined to be equal to or larger than the predetermined angle in the angle determination step, the second map is used, in which the time that it takes for the moving object to arrive at the intersection when the moving object moves in a direction crossing the traveling direction at the detected speed of the moving object in the map is set to be the second time.

5. A driving support apparatus that implements a driving support for avoiding a collision of a host vehicle and a moving object, the apparatus comprising:

first time prediction unit configured to predict an intersection where the host vehicle and the moving object cross in a traveling direction of the host vehicle and a direction crossing the traveling direction, and predicting a first time that it takes for the host vehicle to arrive at the intersection;

second time prediction unit configured to predict a second time that it takes for the moving object to arrive at the intersection when the moving object moves in the direction crossing the traveling direction at a virtual speed which is set virtually;

driving support determination unit configured to determine whether the driving support is to be implemented or not in the host vehicle by applying the first time and the second time predicted by the first time prediction unit and the second time prediction unit, respectively, to a map set in advance;

driving support control unit configured to control the driving support in the host vehicle in a case where the driving support determination unit determines that the driving support is to be implemented in the host vehicle;

traveling state detection unit configured to detect a traveling state of the host vehicle;

moving object state detection unit configured to detect a state of the moving object;

predicted moving direction calculation unit configured to calculate a predicted moving direction of the host vehicle based on the state of the host vehicle detected by the traveling state detection unit;

vector detection unit configured to detect a speed vector of the moving object from the state of the moving object detected by the moving object state detection unit; and angle determination unit configured to calculate an angle formed by the predicted moving direction of the host vehicle and the direction of the moving object, and determining whether or not the made angle is equal to or larger than a predetermined angle, wherein, in a case where the made angle is not determined to be equal to or larger than the predetermined angle by the angle determination unit, the driving support determination unit uses the map, and wherein, in a case where the made angle is determined to be equal to or larger than the predetermined angle by the angle determination unit, the driving support determination unit uses a second map in which the time that it takes for the moving object to arrive at the intersection when the moving object moves in a direction crossing the traveling direction at the detected speed of the moving object in the map is set to be the second time.

6. The driving support apparatus according to claim 5, wherein, in the map and the second map, the first time is set as the vertical axis and the second time is set as the horizontal axis, and a first area where the driving support is determined not to be necessary and the second area where the driving support is determined to be necessary are set, and wherein, in a case where a point at which the first time and the second time cross is present in the second area, the driving support determination unit determines that the driving support in the host vehicle be implemented.

7. The driving support apparatus according to claim 5, wherein the map and the second map are configured to be a single map.

* * * * *